United States Patent
Wee et al.

(10) Patent No.: US 6,697,061 B1
(45) Date of Patent: Feb. 24, 2004

(54) IMAGE COMPRESSION FEATURING SELECTIVE RE-USE OF PRIOR COMPRESSION DATA

(75) Inventors: Susie J. Wee, Mountain Veiw, CA (US); Marc P. Schuyler, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/235,101

(22) Filed: Jan. 21, 1999

(51) Int. Cl.$^7$ .............................................. G06T 15/00
(52) U.S. Cl. ...................... 345/419; 348/423; 348/403; 348/722; 348/416
(58) Field of Search .................................. 345/418, 419; 348/416, 403, 423, 722; 375/240; 341/51

(56) References Cited

U.S. PATENT DOCUMENTS

| | | | |
|---|---|---|---|
| 5,512,953 A | | 4/1996 | Nahumi ....................... 348/441 |
| 5,600,646 A | | 2/1997 | Polomski ..................... 370/263 |
| 5,621,464 A | | 4/1997 | Teo et al. .................... 348/390 |
| 5,623,312 A | | 4/1997 | Yan et al. .................... 348/416 |
| 5,691,775 A | * | 11/1997 | Astle ........................... 348/416 |
| 5,739,862 A | | 4/1998 | Cen ............................ 348/402 |
| 5,793,985 A | * | 8/1998 | Natarajan et al. ........... 345/418 |
| 5,796,434 A | * | 8/1998 | Lempel ....................... 348/403 |
| 6,028,635 A | * | 2/2000 | Owen et al. ................ 348/403 |
| 6,078,616 A | * | 6/2000 | Ozcelik et al. ............. 375/240 |
| 6,081,209 A | * | 6/2000 | Schuyler et al. .............. 341/51 |

OTHER PUBLICATIONS

Shih–Fu Chang, et al., Manipulation and Compositing of MC–DCT Compressed Video, IEEE Journal on Selected Areas in Communications, vol. 13, No. 1, Jan. 1995, pp 1–11.

Huifang Sun, et al., Architectures for MPEG Compressed Bitstream Scaling, IEEE Transactions on Circuits and Systems for Video Technology, vol. 6, No. 2, Apr. 1996, pp 191–199.

Susie J. Wee, Revesing Motion Vector Fields, IEEE International Conference on Image Processing, Chicago, IL, Oct. 1998.

Susie J. Wee, et al., Transcoding MPEG Video Streams in the Compressed Domain, HP Image and Data Compression Conference, Palo Alto, CA, Mar. 1997.

Ming–Syan Chen, et al., Downloading and Stream Conversion: Supporting Interactive Playout of Videos in a Client Station, International Conference on Multimedia Computing, May 1995.

* cited by examiner

*Primary Examiner*—Mark Zimmerman
*Assistant Examiner*—Kimbinh T. Nguyen
(74) *Attorney, Agent, or Firm*—Marc P. Schuyler (57) ABSTRACT

This disclosure provides a compression system for edited images which have previously been compressed. The preferred system uses software to track and determine the nature of edits made to each image frame. Each image frame is divided into spatial regions, and codes defining the nature of changes are then stored in a set of tables called the "registry of edits." When it is time to compress images for output, re-compression software interrogates the registry to determine whether spatial regions in the frame has been altered in a manner that undermines the integrity of the original compression data. For example, if a compressed image signal is modified in the spatial domain to add the logo of a local television station, most of each image frame will remain unchanged and the original motion vectors and residuals (or other compressed representation) from an input signal may be re-used, thereby saving substantial processing time and minimizing introduction of additional quantization errors. The preferred embodiment may be used with most any digital editor or computer to substantially reduce the processing time and resources required to provide a compressed output signal.

17 Claims, 3 Drawing Sheets

IMAGE COMPRESSION FEATURING SELECTIVE RE-USE OF PRIOR COMPRESSION DATA

The present invention relates to image compression. More particularly, this disclosure provides a compression system that re-uses as appropriate compressed data from a compressed input signal when forming a compressed output signal.

BACKGROUND

Conventional editing or other processing of film or video images is performed in the "spatial" domain, that is, upon actual images rather than upon a compressed representation of those images. Since the final product of such editing or processing is frequently an uncompressed signal (such as a typical "NTSC" television signal), such editing or processing can sometimes with today's digital editors and computers be accomplished in real-time. With increasing tendency toward high resolution pictures such as high definition television ("HDTV"), however, Internet, cable, television network and other service providers will likely all have to begin directly providing compressed signals as the final product of editing.

Figure 1:
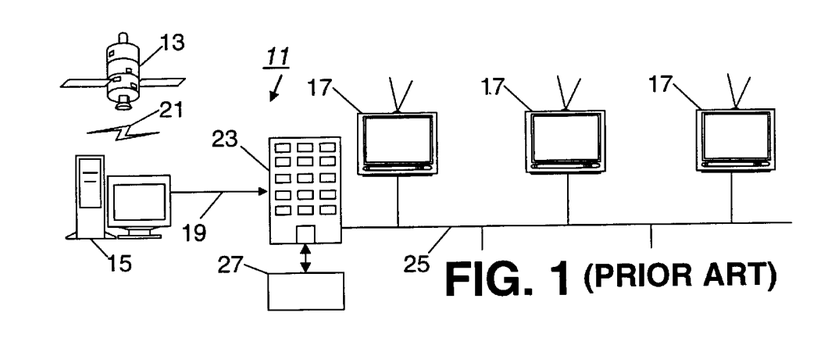
FIG. 1 shows a typical television distribution system, including relay of a satellite signal, receipt and editing of that signal by a service provider, and distribution by cable to a number of television users.

A conventional television distribution system 11 is illustrated using FIG. 1, which shows use of a satellite 13, a digital receiving and processing system 15, and a number of individual television subscribers 17. The digital processing system decodes a satellite signal 21 (or alternatively, a compressed, stored signal) and provides a decoded signal 19 to a service provider 23, for distribution via Internet, cable or another broadcasting network 25. Conventionally, the service provider 23 will perform some edits on the decoded signal, such as to mix different signals or feeds together, provide reverse play of an input signal, insert a logo or provide other edits (such as color correction or blue matting). Examples of conventional editing include mixing different camera angles of a live sports event, as well as inserting television commercials into a signal. These and other types of editing are collectively represented by a reference box 27 in FIG. 1, and are also further illustrated in FIG. 2.

Figure 2:
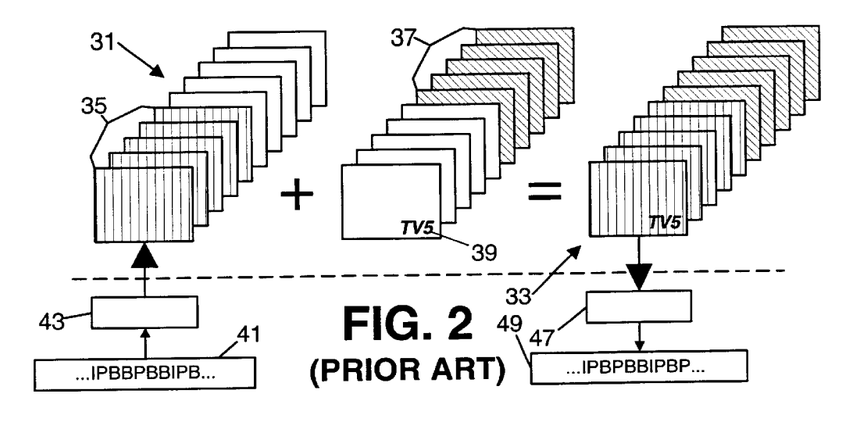

In particular, FIG. 2 shows a set of input images 31 which is to be edited to form a set of output images 33. Two hypothetical edits are illustrated, including a first edit which combines five frames 35 of a first image sequence with five frames 37 of a second image sequence to produce the output images 33. A second edit is also represented by a (hypothetical) logo 39 of a local television station "TF5" which is to be combined with the input images 31 such that the logo appears in the lower right hand corner of the output images 33. To perform these edits, compressed input data 41 must first be processed by a de-compression engine 43. Following editing, the output images 33 must then also be re-compressed by a compression engine 47 to produce compressed output data 49. Both the compressed input and output data are seen to be in partially compressed MPEG format, with image frames encoded as "I," "P," or "B" frames as will be explained below. One of the most time intensive steps in this process is the compression of the output images 33, which will be explained with reference to FIG. 3.

Figure 3:
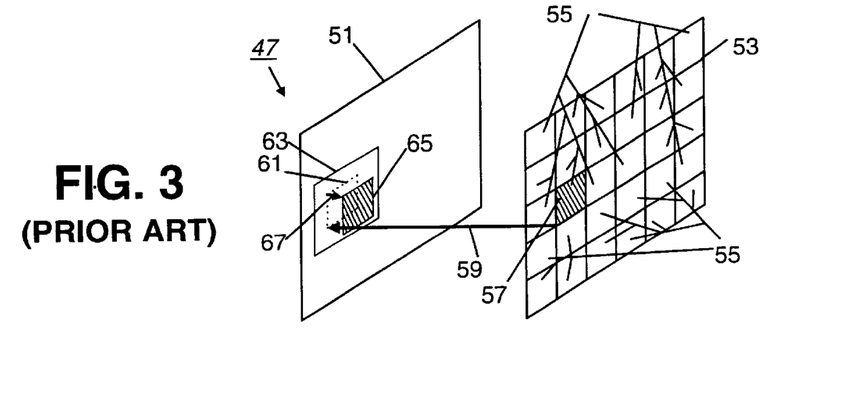
FIG. 3 illustrates conventional motion search in a MPEG system, where an image tile in a second frame is compared to a search area in a prior frame to determine a "closest match". From the closest match, a motion vector and associated set of residuals are determined which enable exact reconstruction of the image tile from the prior image.

In this regard, compression techniques generally rely on block-based (e.g., tile-based or object-based) encoding, which is introduced with reference to FIG. 3. Well known compression techniques include "JPEG," "MPEG," "MPEG-2," "MPEG-4," "H.261," and "H.263." FIG. 3 shows two image frames 51 and 53. The second image frame 53 of FIG. 3 is divided into a number of square tiles 55, and it is desired to compress the second frame so that relatively less data is used for image representation. In typical image compression, each tile 65 will be separately compressed to remove either spatial redundancies within the same frame (the second frame 53) or temporal redundancies between frames (e.g., by comparison to the first frame 51). In this example, it is to be assumed that the second frame will be compressed only to remove temporal redundancies between different frames, but similar principles can be applied to reduce spatial redundancies within the same frame.

In performing compression, a digital editor or computer compares pixels in each tile in the second frame with image pixels found at or near an expected tile location 61 (e.g., the same position) within the first image frame 51. This comparison is indicated by a reference tile 57 in the second image frame and an arrow 59 which points to the same tile location in the first image frame. The digital processing device sequentially compares pixels from the reference tile 57 with different pixel subsets of a fixed "search window" 63 to determine a "closest match." The "closest match" in FIG. 3 is indicated by a hatched square 65, which is illustrated as slightly offset from position of the tile 61. With the "closest match" having been found, the digital processing device calculates a motion vector 67 and a set of pixel difference values called "residuals."

Once all tiles have been placed into motion vector and residual format, the motion vectors and residuals are then encoded in a compact manner, usually through "run-length coding," "quantization" and "Huffman coding." During later de-compression, for example, at a network, television station, editing facility, or at an end-viewer's computer or television, the second frame is completely re-calculated from an already-de-compressed first frame by re-constructing each tile using motion vectors and residuals. The various standards mentioned above generally operate in this manner, although some new standards call for subdividing images into variable size objects instead of tiles (the principles are, however, similar).

A compressed input signal is conventionally edited in the spatial domain only after an entire group of frames of the input signal have been completely de-compressed. Frames within the de-compressed group can then be edited for color, frame order such as for reverse play or splicing, or frame content (such as logo insertion). Once an edited signal is ready for output, the signal is then usually compressed anew, using a closest match search for each tile of images of the desired output signal. Typically, all images in a sequence, and all portions of all images affected by any edits, are de-compressed prior to editing. Thus, re-compression can be quite time intensive. For example, as much as seventy percent (70%) of resources used by a digital processing device to compress an image are applied to searching for the "closest matches" and associated motion vectors. Practically speaking, it is extremely difficult to compress these image sequences in real-time. Taking HDTV as an example, compressing many millions of bits per second is difficult even for today's multi-megahertz computers.

A need exists for a system that can more quickly compress edited signals, particularly those signals which have previously been compressed. Ideally, such a system would operate in a manner compatible with existing object-based and block-based standards, and would operate on spatial regions within an image, e.g., such that it can specially handle logo insertion and the like. Further still, such a system ideally should be implemented in software, so as to improve the speed at which existing machines process video and facilitate applications of real-time editing or compression. The present invention satisfies these needs and provides further, related advantages.

SUMMARY OF THE INVENTION

The present invention provides for quicker compression of an edited image by determining whether prior compression information (or data) for certain parts of the unedited image may be re-used. For example, by re-using motion vectors from the un-edited image data, the present invention provides for substantial savings in processor time and resources that would otherwise be occupied with motion search. Certain aspects of the present invention also provide for reduction of quantization errors in re-compressing an edited signal. With increasing use of high definition television ("HDTV") and high resolution formats imminent over the coming years, the present invention facilitates real-time image editing and compression of image signals (such as HDTV or other image signals). The present invention should find ready application to network, professional and home editing of image signals, whether performed by powerful digital editors or on a computer.

One form of the present invention provides a method of editing an input image that is at least partially compressed, using an editing device, an input buffer, a de-compression engine and a compression engine. At least one data block of an input image frame is stored in the buffer in compressed format, such as in bitstream or motion-vector-and-residual format. As would be conventional, the block of data is converted to spatial domain format and editing or processing of the data could include, for example, splicing images together, providing reverse play or otherwise processing an anchor frame such that frame order is affected, editing the input image frame itself to change relative position of the data within frame, changing compression values such as bit rate, or editing pixel values represented by the frame. After editing or processing, the spatial domain data is then compressed in preparation for output, as would be conventional. In the compression process, however, the compression engine uses a table which provides information on whether individual regions within the frame have been edited (or motion vectors and residuals represented by the compressed data for the region have been otherwise affected, such as for example where an anchor frame referenced by the current frame has been edited). If editing or processing of this data has not affected the validity of the compressed input data in the input buffer, then at least some of the compressed data is used as part of the system's compressed output.

In more detailed aspects of the invention, the compression engine can exactly re-use an original motion vector and associated residuals when a corresponding block of uncompressed data has not been changed in a manner that undermines the validity of the compressed form of the data. A table can be created for each frame in a group of frames, to thereby create a registry of edits, created in association with editing, where each table entry represents a region of a corresponding image frame. In this manner, the system can re-use original motion vectors and residuals except for limited regions of an image frame that have been affected by image editing (e.g., logo insertion, blue matting, etc.), for each image (or DCT) tile within a region. Also, if desired, selective "slices" of compressed input image data only can be decoded from the compressed input for editing, and entries of the table can in this case represent either individual slices or subdivisions of a slice. In even more detailed aspects of the invention, the table entries can be more complex, and if certain types of editing have occurred in the region, then the original motion vector can be used as a motion estimate or raw calculation of motion, and new residuals within a fixed search window can be calculated.

Other forms of the invention provide an improvement in image compression and an apparatus for image compression, which roughly correspond to the principles identified above.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 2 illustrates conventional editing of a compressed image sequence, and re-compression of an edited output image sequence. FIG. 2 illustrates a number of different types of editing that may be performed in the spatial domain, including logo insertion and including splicing of two image sequences together to create a third image sequence.

FIG. 5 shows a hypothetical image frame which includes two people and a local television station logo which has been inserted in the lower right-hand corner of the frame. FIG. 5 also shows the division of the image frame into a number of spatial regions (indicated by dashed lines) and the relative size in the preferred embodiment of these spatial regions to a conventional 8-pixel-by-8-pixel image (or DCT) tile 143.

FIG. 6 shows a preferred table in the registry of edits which indicates changes to the input image of FIG. 5 to insert the local television station logo 135.

FIG. 7 shows another table similar to FIG. 6, but where each spatial region is represented by two bits which encode up to four different types of editing performed on the associated spatial region.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a system that provides for compression of images where compressed bitstream or motion vector information is already available. The invention, however, may also be applied to other types of systems as well.

In accordance with the principles of the present invention, the preferred embodiment tracks the nature of edits made to each frame and to each portion of each frame to determine whether those edits change the validity of the original compressed input representation of the (now decompressed) image frames. If editing has changed that compressed representation to a point where it is no longer accurate, the preferred compression system performs full motion search and residual calculation for an entire region of the image frame of interest; in other words, the preferred compression system performs full motion search and residual calculation for each image tile in that region. Alternatively, some types of editing (e.g., color correction) may render the original compressed representation no longer exactly correct; in this instance, the preferred compression system can determine that motion for each image tile in the region is approximated by the original motion vector from the compressed input signal, but that new residuals should be calculated. Finally, the preferred compression system also detects whether the region of interest of the output signal has been changed at all relative to the input signal; if there has been no change, the preferred compression system exactly re-uses original motion vectors and residuals from the compressed input signal for each image tile in the unchanged region.

As can be seen from the foregoing, the preferred embodiment potentially requires a great deal fewer processing resources to edit a compressed input signal and provide an edited compressed output signal. When it is considered that many types of editing leave most of the original image sequence unaltered, e.g., logo insertion, and that motion search and residual calculation conventionally requires 70% of overall time required for compression, it can be seen that the processing resources saved can be quite impressive. Moreover, by using original motion vectors and residuals, the preferred embodiment helps minimize the amount of quantization errors that might otherwise be introduced into the compressed output signal.

Figure 4:
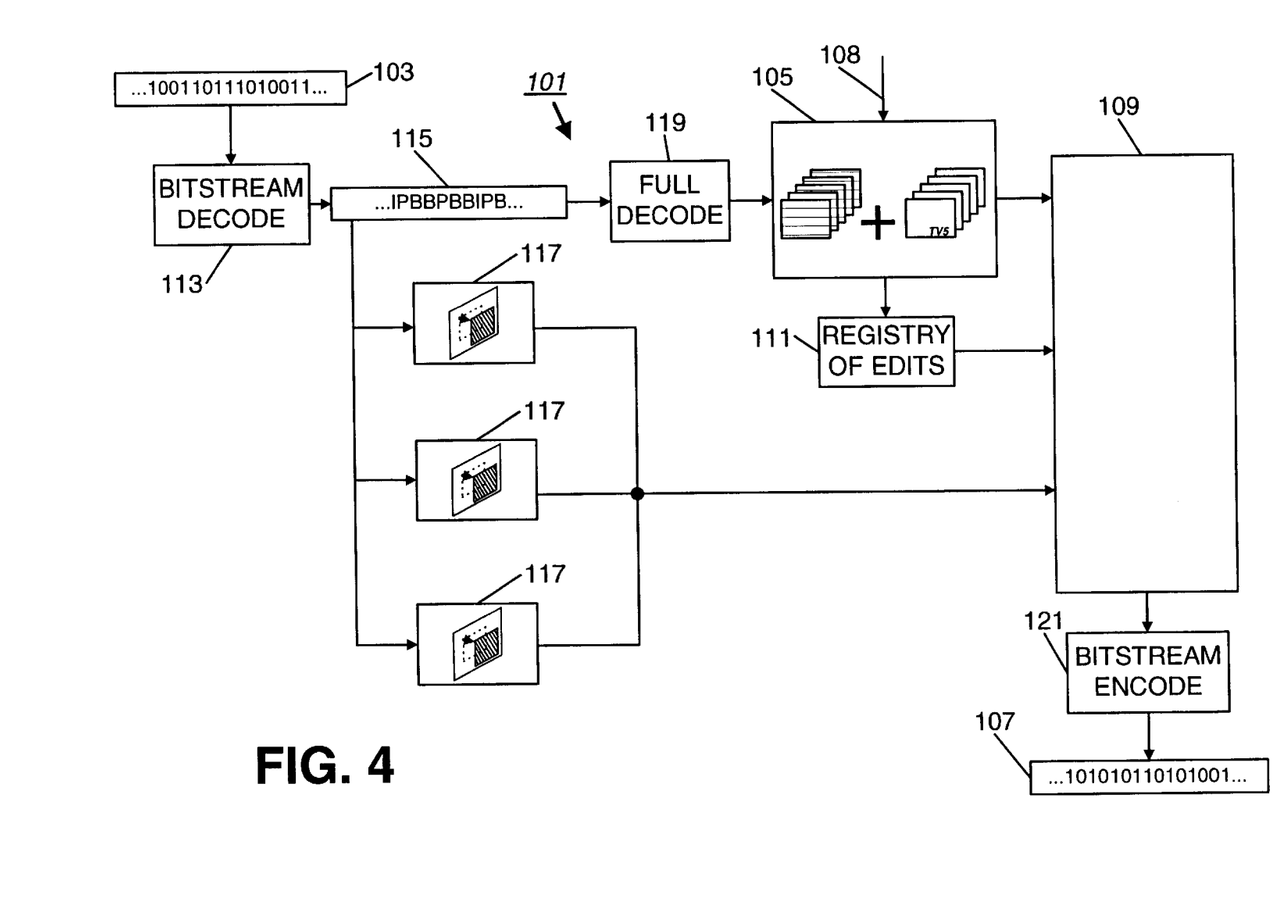
FIG. 4 illustrates the operation of the preferred embodiment, which uses a registry of edits and a compression engine to selectively re-use motion vectors and associated residuals from a partially compressed input image sequence.

FIG. 4 illustrates operation of the preferred embodiment 101. It is desired to edit a compressed image signal 103 using conventional image editing equipment 105, and to produce a compressed output signal 107. Each of the input signal 103 and the output signal 107 are illustrated as including a number of zeroes and ones, representing the fact that these signals have been "fully compressed" bitstreams. By the term "fully compressed," it is meant that a "partially compressed" signal has been further compacted to remove unnecessary bits, for example, through techniques such as quantization, run-length coding and Huffman coding. By "partially compressed," it is meant that an image frame has been motion compensated, e.g., placed in motion vector and residual format, such as under one of the MPEG standards. As would conventionally be the case, images are preferably converted to the spatial domain in preparation for processing or editing, and are then re-compressed to form the output signal 107. However, in accordance with the present invention, re-compression is performed using a preferred compression system designated by the reference numeral 109 in FIG. 4.

The input signal 103 is first partially decoded to place the signal in a partially compressed format (as indicated by reference blocks 113 and 115 in FIG. 4). The reference block 115, is depicted as having a number of different image frames, each represented by the letter "I," "P," and "B," in accordance with the well-known MPEG standards. Each one of these frames is stored in an input buffer 117 in a manner that places motion vectors and residuals for each image (or DCT) tile at known locations in the buffers 117; a sufficient number of buffers are utilized, such that several frames (e.g., an entire group of frames) can be retained in memory for a period of time. From these buffers 117, preferred image processing software then proceeds to fully decode each image frame to the spatial domain, as indicated by the reference block 119 in FIG. 4. The editing device 105 can then perform editing or processing as desired, for example, as represented by user input 108 which can include a set of commands or a second set of image frames that are to be combined in some manner with the input signal. Editing that conventionally might be performed on the input sequence can include color correction, mixing of two video sequences together, splicing of one image sequence with another image sequence (i.e., such as a movie or sporting event with a television commercial), logo insertion, reverse play of the input signal (e.g., for a live sporting event), or other conventional types of image processing.

The preferred embodiment is implemented as software or firmware running on a digital image processing machine; this software or firmware (collectively referred hereafter as "software") creates and maintains registry of edits 111, which essentially is a code table for each image frame that goes through the editing process (these tables will be explained further below in connection with FIGS. 6 and 7). The registry of edits 111 is accessed during the re-compression process 109 to determine whether original motion vectors from the input signal should be used for the output signal, or whether motion search should be performed anew upon the output signal for a given region of interest; the entries in each table correspond to spatial regions of a corresponding image frame. The re-compression process places the output signal into a "partially compressed" format. This "partially compressed" format is then fully encoded as a compressed bitstream, as indicated by block 121 of FIG. 4, to yield the output signal 107.

Importantly, for regions of an image frame that have been unchanged from the input signal, and which still correctly enable full image reconstruction either by themselves or by correct reference to an anchor frame (i.e., an "I" or "P" frame on which the present frame depends), full compression should not introduce significant quantization errors (i.e., due to rounding). In this regard, original motion vector and residuals will have already been rounded in a manner suitable for Huffman coding and run-length encoding and remain unchanged for the output. That is to say, where the system simply copies motion vectors and residuals directly from an input buffer, subsequent Huffman coding, quantization and run-length coding should avoid further quantization errors. In some special cases (such as an alternative embodiment mentioned below), e.g., where a slice remains untouched by editing, it may be possible to avoid subsequent Huffman coding, quantization and run-length coding, and instead simply copy select bits from the input bitstream into a newly created output bitstream. [A "slice" is a portion of the bitstream for a particular image frame which may be independently accessed and parsed from the compressed bitstream.]

Operation of the preferred embodiment upon a hypothetical image and editing process is explained with reference to FIGS. 5–7. FIG. 5 presents a hypothetical image frame 131 having two people 133. It is desired to edit this image frame to insert a local television station logo 135 into the lower right-hand corner of the image frame. The input signal for the image frame is in the preferred embodiment fully de-compressed to the spatial domain, and a conventional image editing device then processes the image frame 131 to insert the logo 135. During this process, the preferred embodiment divides the image frame 131 into a number of spatial regions, which are essentially macro tiles, illustrated via dash lines in FIG. 5. FIG. 5 illustrates nine columns and seven rows of such tiles to yield a total number of tiles (sixty-three) which equals or is slightly less than a base two number (e.g., sixty-four), for each of processing, storage and comparison. The first bit of each table is used to indicate whether any portion of a frame has been edited at all, e.g., if no editing has occurred, the "I," "P," or "B" version of the frame is completely copied from the appropriate input buffer (117 in FIG. 4), with updating or adjustment of minor information such as time codes being performed as necessary. Also, the shape of the spatial regions are preferably rectangular or square, with size dimensions being integer multiples of eight pixels for an MPEG-2 system. In this manner, the system can discretely associate image (or DCT) tiles 143 with only one spatial region.

Figures 5, 6, 7:
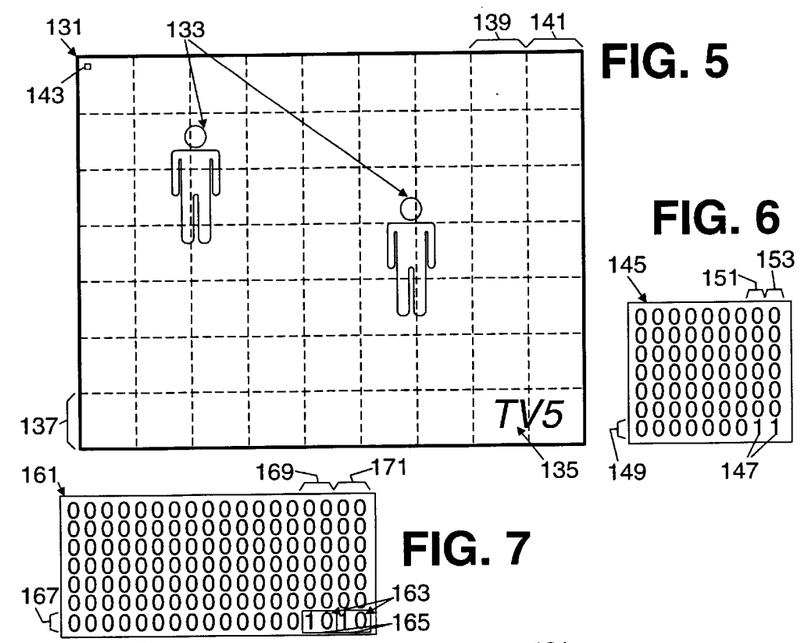

Importantly, the preferred spatial regions indicated in FIG. 5 should not be confused with the relatively much smaller tiles used in motion search; one of the smaller image (or DCT) tiles is illustrated in FIG. 5 by the reference numeral 143. Preferably, a relatively small number (e.g., between a few dozen and a few hundred) of such regions are used, thereby enabling block handling of large numbers of image (or DCT tiles).

The preferred embodiment would determine with respect to the hypothetical image and edits of FIG. 5 that only two spatial regions are affected by the editing, namely, the regions associated with the bottom-most row 137 and the right-most two columns 139 and 141 of regions for the image frame. Accordingly, the software would create a table 145 corresponding to the image frame 131 which includes 63 entries, also arranged in seven rows and nine columns. Since only two spatial regions have been affected by the edits, the table is formatted to include two ones 147 for the bottom-most row 149 in the table and the right-most two columns 151 and 153 of the table 145, while the remaining of entries are set to zero.

During re-compression, the preferred embodiment will access the lead bit (which is set to one, to indicate that the frame or an anchor frame upon which the frame depends has been edited in some manner) as well as the 63 bits of table 145, and will the determine that each spatial region represented by a zero has been unaffected by the edit. Accordingly, the preferred embodiment will perform motion search for each relatively small image tile (e.g., such as tile 143 in FIG. 5) in affected spatial regions by retrieving exactly the motion vector and residuals from the partially compressed representation of the image, such as is stored in the buffers 117 depicted in FIG. 4. When it comes time to perform motion search for image (or DCT) tiles falling within the last two spatial regions (corresponding to the two ones 147 from FIG. 6), the preferred embodiment will upon polling of the table 145 discover the presence of the ones 141 and consequently automatically perform full, conventional motion search processing for all image tiles in these regions with respect to any existing anchor frames.

FIG. 7 shows an alternative arrangement where editing upon each spatial region is described by multiple bits, e.g., two bits per region. Applied to the image 131 from FIG. 5, this alternative embodiment would form a table 161 having two bits for each region, representing four possible types of editing. Since as was the case with FIG. 6 only the last two spatial regions have been affected, all other entries in the table 161 will consist of two zeros. The entries 165 corresponding to the last two spatial regions are seen in FIG. 7 to include a two-bit binary representation of the number "2", as seen in the seventh row 167 and the last two columns 169 and 171. This number 2 may represent an additional re-compression strategy using original motion vectors from the input signal. For example, the binary codes for the number zero ("00") may be used to represent the fact that no editing at all has been performed on a given spatial region; the binary representation ("01") of the number one may be used to represent drastic edits to the spatial region which require full new motion search and residual calculation. For non-drastic edits, the preferred software may use the original motion vector as an estimate of motion in the output signal and thereby perform limited or no searching prior to calculating residuals. In other words, this third strategy (represented by the binary code for the number "2") causes the system to use the original motion vectors but calculate a completely new set of residuals. This third strategy for non-drastic edits is preferably used when changes to a particular spatial region are small; a non-drastic edit can be identified, for example, by determining that the number of changed pixels in the region falls below a predetermined threshold), or for edits of a nature which do not necessarily invalidate the original motion vectors (such as color correction). Alternatively, this third strategy can be used for identifying an alternative use of prior motion vectors, such as for calculation of a reverse motion vector field for another frame, in the case of editing to provide reverse play.

In managing the table, the image processing software or editor initializes the preferred table structure to have all zero values prior to accessing a frame. Any re-ordering of a "P" or "B" frame relative to one of its anchor frames will preferably cause the lead bit of all tables for dependent frames to be set to the value one (e.g., backwards play or splicing). Alternatively, if only a subset of an anchor frame is edited (even if no re-ordering occurs), the software sets selective bits in tables for each dependent frame to one; as an example of this latter point, if the image seen in FIG. 5 was an anchor frame, each frame depending upon the anchor frame would preferably also have at least the lower two bits of their tables set in a similar manner, even if no editing (e.g., logo insertion) has been performed in those dependent frames. Importantly, the preferred software also sets the bits for border spatial regions to one in these dependent frames. Applied to the table of FIG. 5, for example, if it is assumed that FIG. 5 represents editing to an anchor frame, the preferred software would set the bits in the right-most three columns, lower-most two rows to one, since these spatial regions might have motion vectors that point to the edited portion of an anchor frame. Finally, if the image frame under consideration has itself been edited, the preferred software will compare new, edited pixel values for a region with prior values to ascertain the existence of any changes; if pixels within a region have been changed, the preferred software sets an associated bit, indicating that original compression data from the input buffer may not be directly re-used in forming an output.

In the alternative, multiple-bit table system operation is similar, except that the software or editor examines each region to determine whether threshold conditions are met, such as the nature of editing, number of changed pixels, etc., and assigns one of several binary codes based on these conditions. The choice of multiple compression strategies based on different types of editing is arbitrary, which is to say, one skilled in the art may easily select any compression strategy that makes sense in view of a particular application.

Figure 8:
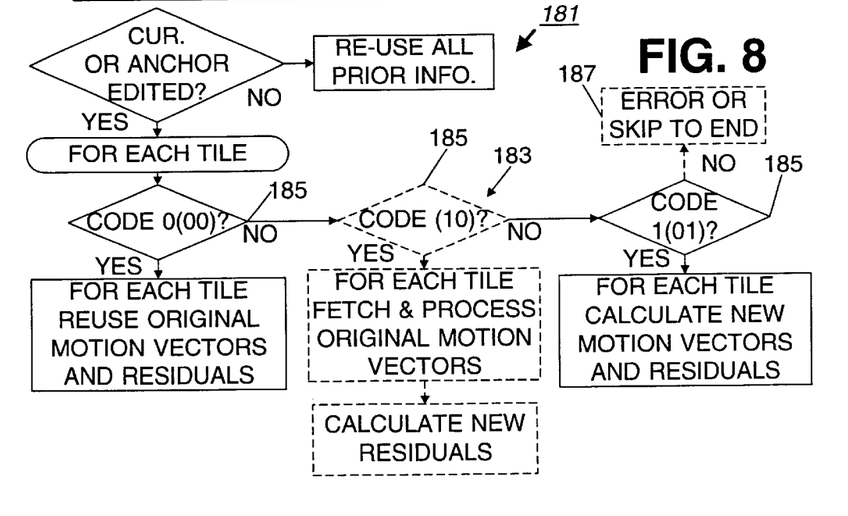
FIG. 8 is a software block diagram indicating motion search computation in both the preferred embodiment (solid lines) and an alternative embodiment which makes use of three motion search strategies (indicated by both dashed lines and solid lines).

FIG. 8 is used to explain subsequent use of the tables and registry of edits. In particular, once all editing or other processing has been completed, the compression software will for, each frame to be compressed, perform motion search for each individual image tile, moving from left-to-right, in rows from top-to-bottom across an image frame. For each tile as it does so, the compression software will obtain the current frame's table from the registry of edits and access the table entry for the region of interest.

The processing performed by the preferred embodiment is indicated in solid lines in FIG. 8. For each image tile, the preferred embodiment will determine whether the table's entry for the region has a value of zero or one. If the value is zero, the preferred software will simply access the motion vector and residuals for the current tile, which are still stored in one of the buffers 117 from FIG. 4, and motion vector search is deemed complete for that tile. Alternatively, if the entry has a value of one, then the preferred embodiment will perform full, conventional motion search and residual calculation without reliance upon the prior motion vectors or residuals.

FIG. 8 also indicates in both solid and dashed lines the processing performed by the alternative embodiment of FIG. 7. In this case, three different decision blocks 185 are represented, corresponding to the addition of a third motion search strategy 183. Since this embodiment uses 2-bit table entries, each region's table entry has the aforementioned values of zero and one, as well as two other possible values of two and three. In the dashed-line center column of FIG. 8, the software associates values of two with non-drastic edits, and responsively calculates new residuals using the location identified from the original motion vectors from the appropriate buffer 117 (from FIG. 4). The value of three may optionally be used to represent yet another motion search strategy, but as indicated by the reference block 187 of FIG. 8, this value can also be used for other purposes. For example, this value could be used as an escape character to indicate that no subsequent spatial region reflects any editing or processing, such that the remaining image (or DCT) tiles for a frame may be processed simply by copying their motion vectors and residuals from the appropriate input buffer.

By re-using original motion vectors or original motion vectors together with their corresponding residuals, the preferred embodiment provides substantial savings in processing time and resources that would otherwise be required to format a compressed output signal. Accordingly, the preferred embodiment should find ready application to editing or other processing of compressed image signals such as likely will be required by the new HDTV standards. The preferred software can be implemented at the level of a television network, a local cable provider, or an Internet provider, or by a post production or other editing facility. The preferred software may also be used by end users on a home computer who wish to edit or otherwise process image sequences stored in digital memory, such as on compact disc.

Having thus described two particular embodiments, it will become apparent to one having ordinary skill of the art that one may implement minor design choices while without departing from the spirit of the present invention. For example, an embodiment may be preferred for some applications which selectively re-uses portions of an input bitstream without any decompression whatsoever. For example, such an embodiment would simply decode portions of the bitstream (e.g., slices of the bitstream) and perform editing on those slices only, such as for logo insertion. Portions of the bitstream unaffected by editing could then simply be mapped to an output signal, with a new "insert" bitstream segment being computed by the compression software. Also, the subdivision of spatial regions do not need to be rectangular or square, or even identical in shape; use of variable size spatial regions might be consistent with the newer compression standards, e.g., MPEG-4. Further still, more than two or four editing codes may be used, and other motion search strategies may be implemented which call for re-use of original motion vectors in some manner to reduce the motion search tasks that would conventionally be required. All of these and other minor design choices embody the spirit of the present invention.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A method of editing an input image frame using an editor, an input buffer, a de-compression engine and a compression engine, said method comprising:

dividing the input image frame into plural spatial regions;

storing data from at least one of the spatial regions as compressed input data in the input buffer;

using the de-compression engine to convert data of the input image frame to the spatial domain;

editing with the editor at least one of
the input image frame,
an anchor frame upon which the input image frame depends, and
the order of the input image frame relative to an anchor frame upon which the input image depends to thereby prepare spatial domain output data for compression; and using the compression engine to convert the spatial domain output data to compressed output data;

wherein,
using the editing device includes creating a table having an entry for each region, where each entry represents whether predetermined editing has been performed with respect to the associated region which affects whether the compressed input data (for the associated region) in the input buffer may be re-used as part of the compressed output data, and
using the compression engine to convert includes re-using at least some of the compressed input data from the input buffer to produce compressed output data, in dependence upon the entries in the table.

2. A method according to claim 1, wherein using the compression engine to convert includes obtaining an original motion vector from the input buffer and exactly re-using that original motion vector as part of the compressed output data, for each of multiple image tiles within a region that has not had predetermined editing performed which affects that region.

3. A method according to claim 1, wherein using the compression engine to convert includes calculating new residuals in a spatial region whose input compression representation is affected by editing, regardless of whether editing has actually resulted in changed pixel values within the region.

4. A method according to claim 1, wherein using the compression engine to convert includes for each region, determining whether editing has occurred which affects that region and, responsive to a determination that no editing has occurred, retrieving each of plural original motion vectors from the input buffer falling within the region each for exact use as a new motion vector in the compressed output data.

5. A method according to claim 4, wherein:
    said method further includes subdividing each of plural input frames into plural spatial regions, each spatial region occupying identical size and position with respect to all frames;
    editing includes creating a table for each of the plural input image frames, to thereby create a registry of edits, and placing a predetermined entry for each region into each table if editing has not been performed which affects the associated region; and
    determining includes checking, for each region, for presence of the predetermined entry in the corresponding table.

6. A method according to claim 4, wherein:
    storing data in the input buffer includes storing at least one original motion vector and corresponding original residuals; and
    determining includes, responsive to a determination that no editing has occurred which affects a region, retrieving an original motion vector and corresponding original set of residuals for the region from the input buffer for use in the compressed output data.

7. A method according to claim 6, wherein:
    each original motion vector stored in the input buffer is accompanied by a corresponding original set of residuals;
    editing includes, for each of multiple regions, placing a first predetermined entry in a table if editing has not affected that region at all and a second predetermined entry if editing has affected that region in a manner consistent with all original motion vectors for the region, such that the original motion vectors are adapted for use to predict motion reflected by the compressed output data;
    determining includes checking, for each region, for presence of a predetermined entry in the table; and
    for each region
        if the table contains the first predetermined entry then using each original motion vector and corresponding original set of residuals for the region from the input buffer in the compressed output data,
        if the table contains the second predetermined entry then using each original motion vector to limit any motion search, and
        if the table contains none of the first predetermined entry and the second predetermined entry then calculating a new motion vector by motion search not limited in dependence upon an original motion vector and calculating new residuals.

8. A method according to claim 1, wherein each entry is set to a predetermined value in response to a change in frame order which affects dependence of the input image frame relative to an anchor frame.

9. For use with an image editing system that receives a compressed input image frame and outputs a compressed output image frame, the image editing system having a de-compression engine that converts input data from a compressed format to spatial domain data, an editor that edits at least one of (a) the input image frame, (b) an anchor frame upon which the input image frame depends, and (c) order of the input image frame relative to an anchor frame upon which the input image frame depends, and a compression engine that converts the spatial domain data following editing to compressed output data, an improvement comprising:
    dividing the input image frame into plural spatial regions;
    during or prior to de-compression, storing at least some data for the input image frame in compressed format in an input buffer;
    in response to predetermined editing, creating a table having plural entries that represent the plural spatial regions; and
    for each region, compressing any spatial domain data within the region to form the compressed output data by determining from the table whether no editing has been performed within the region and,
    if no editing has been performed within the region, retrieving from the input buffer at least one original vector and deriving in dependence thereon a new motion vector.

10. An improvement according to claim 9, further comprising:
    for each region, for each of plural image tiles falling within the region, retrieving from the input buffer and exactly re-using an original motion vector and associated residuals.

11. An improvement according to claim 10, wherein the improvement is implemented via one of software and firmware.

12. An improvement according to claim 9, further comprising a table that stores multi-bit values representing whether associated spatial regions of an image frame have been edited.

13. An improvement according to claim 9, further comprising:
    responsive to an editing process in which one of a first group of edits are performed which affect motion-vector-and-residual format data for a region, placing a first predetermined entry into the table to indicate that an original motion vector and associated original residuals from the input buffer may not be re-used in forming the image output;
    responsive to an editing process in which one of a second group of edits are performed which affect motion-vector-and-residual format data within the region, but none of the first group of edits, placing a second predetermined entry into the table to indicate that original motion vectors may be re-used in deriving new motion vectors; and
    in compressing data, re-using original motion vectors from the compressed input image in dependence upon the table contents.

14. An improvement according to claim 13, further comprising:
    a table that stores multi-bit values representing whether associated spatial regions of an image frame have been edited; and responsive to an editing process in which one of no editing is performed which affect motion-vector-and-residual format data within a region, placing a third predetermined entry into the table to indicate that original motion vectors and corresponding original residuals may be re-used in producing the compressed output data.

15. An improvement according to claim 9, wherein each of multiple locations within the table corresponds to a rectilinear, fixed-size spatial region of an image frame.

16. An improvement according to claim 9, further comprising creating a table for each one of plural input frames, to thereby create a registry of edits.

17. An apparatus for compressing spatial domain image frame data into motion vector and residual format output data, comprising:

an input buffer having original compression data stored therein associated with the image frame data;

a table corresponding to the image frame, the table having a number of entries, each entry corresponding to a different spatial region of the image frame; and a compression engine that converts the spatial domain data to the motion vector and residual format, including one of hardware, software and firmware that associates data to be converted to the motion vector and residual format output data with a spatial region, interrogates a corresponding entry in the table and, responsive to the entry, performs at least two of retrieving original compression data corresponding to the associated spatial region from the input buffer, and directly using the retrieved compression data as part of the output data, retrieving an original compression data from the input buffer, and using motion vectors from the original compression data to reduce search, but calculating at least new residuals, and calculating a new motion vector and associated residuals based on motion search which compares the spatial domain data to other image data, without using original compression data vector from the input buffer.

* * * * *